United States Patent [19]

Röhm

[11] Patent Number: 4,702,485

[45] Date of Patent: Oct. 27, 1987

[54] PERCUSSION DRILL AND CHUCK ARRANGEMENT THEREFOR

[76] Inventor: Günter H. Röhm, Heinrich-Röhm-Str. 50, 7927 Sontheim, Fed. Rep. of Germany

[21] Appl. No.: 839,421

[22] Filed: Mar. 13, 1986

[30] Foreign Application Priority Data

Mar. 14, 1985 [DE] Fed. Rep. of Germany ....... 3509165
Apr. 27, 1985 [DE] Fed. Rep. of Germany ....... 3515259

[51] Int. Cl.[4] ........................ B23B 31/04; B25D 17/08

[52] U.S. Cl. ...................................... 279/19.4; 173/48; 279/62

[58] Field of Search ................................. 279/19-19.7, 279/60-65, 75; 408/239 R, 239 A; 173/48

[56] References Cited

U.S. PATENT DOCUMENTS

| | | | |
|---|---|---|---|
| 2,684,856 | 7/1954 | Stoner | 279/61 |
| 3,985,368 | 10/1976 | Bettes et al. | 279/75 |
| 4,131,165 | 12/1978 | Wanner et al. | 279/19.3 |
| 4,491,444 | 1/1985 | Rumpp et al. | 173/47 |

FOREIGN PATENT DOCUMENTS

| | | | |
|---|---|---|---|
| 2826153 | 12/1979 | Fed. Rep. of Germany | 279/19 |
| 3413581 | 10/1985 | Fed. Rep. of Germany . | |

*Primary Examiner*—Z. R. Bilinsky
*Attorney, Agent, or Firm*—Karl F. Ross; Herbert Dubno

[57] ABSTRACT

A drill chuck can be driven by and rotated with a drill spindle. The drill chuck has an axial passage through which the impact effort of a central anvil shaft can be transferred to the drill. The drill can be held in chuck jaws, the movement of which can be controlled by a control sleeve. For connecting the drill chuck at the drill spindle in such a way that they rotate together, there is provided a coupling element and this can allow an axial displacement of the drill chuck at the drill spindle. This mode can be turned off, or on, by use of a locking mechanism and with a coupling ring. The lock mechanism includes a lock element which is axially fixed with respect to the drill spindle, which can be actuated by the coupling ring. The coupling ring can be axially shifted but it can be fixed so as not to rotate. The lock element can be moved into respective recesses arranged circumferentially at the chuck body for precluding axial displacement of the chuck body. The coupling ring has teeth which can engage in matching teeth of the control ring.

18 Claims, 6 Drawing Figures

PERCUSSION DRILL AND CHUCK ARRANGEMENT THEREFOR

CROSS REFERENCE TO RELATED APPLICATIONS

This application is related to my commonly owned copending applications:

| Ser. No. | Filing Date |
|---|---|
| 808,894 | 13 December 1985 |
| 808,891 | 13 December 1985 |
| 808,893 | 13 December 1985 |
| 788,775 | 18 October 1985 |
| 744,795 | 13 June 1985 |
| 702,049 | 15 February 1985 |
| 702,053 | 15 February 1985 |
| 686,243 | 26 December 1984 |
| 743,583 | 11 June 1985 |
| 658,133 | 5 October 1984 |
| 726,596 | 23 April 1985 |
| 726,587 | 23 April 1985 |
| 731,655 | 7 May 1985 |
| 719,760 | 4 April 1985 |
| 720,259 | 5 April 1985 |
| 703,888 | 21 February 1985 |
| 654,792 | 26 September 1984 |
| 654,791 | 26 September 1984 |
| 591,975 | 21 March 1984 |

and the references cited therein.

FIELD OF THE INVENTION

My present invention relates to a percussion or hammer drill and to a chuck arrangement therefor.

More particularly, the present invention relates to a percussion or the like drill wherein the respective drill chuck is mounted on the drill spindle for rotation therewith and in which the drill spindle has a longitudinal axial passage through which the impact force or action of a central ram rod is imparted to the drill bit which is held in the drill chuck between centrically adjustable chuck jaws.

BACKGROUND OF THE INVENTION

In such apparatus the central shaft or ram rod is axially guided in the hollow drill spindle, and at least one coupling element is provided for connecting the drill chuck to the drill spindle. The coupling element can be arranged, on the one hand, in retainers of the drill spindle, and in retainers in the chuck body of the drill chuck, on the other hand. As a function of its setting, the coupling element, however, will allow an axial clearance, play or displacement of the chuck body with respect to the drill spindle, and this can be selectively set and terminated by a locking mechanism having a coupling ring.

The German patent publication DOS No. 34 13 581 which may not be prior art hereto,(see the aforementioned list of earlier applications), discloses a percussion drill in which the locking mechanism is a contact ring which is arranged on the drill spindle so that it can rotate or turn, but which is fixed when considered axially or longitudinally. The contact ring is arranged axially opposite along an annular shoulder of the drill spindle, and it carries abutment or contact projections which are directed towards the annular shoulder and which preclude the axial shifting or displacement of the drill chuck on the drill spindle when they come into contact with the spindle shoulder, i.e. the annular surface thereof.

The annular surface of the annular shoulder includes abutment recesses into which the abutment projections can reach, and the depth of these abutment recesses is at least equivalent to the magnitude of the permitted axial displacement or play of the drill chuck. Accordingly, when the contact ring is turned such that the abutment projections are in alignment with the recesses and the projections can enter into the respective recesses, the axial shifting is possible, i.e. the mode of operating with axial chuck play is established.

It follows that the drill spindle must be provided with abutment recesses which are adapted in size to the abutment projections of the chuck that is being used. Furthermore, the mentioned locking mechanism is primarily intended for such impact drills in which the axial displacement is of relatively minor magnitude, i.e. only a minor stroke or displacement distance is provided.

However, when a chuck is to carry out a large stroke, for example, as large as that of the drill, in the mentioned locking mechanism the size of the chuck is increased in approximate conformity with the magnitude of the stroke of the attendant movements. Finally, in the mentioned percussion drill inherently undesirable operational conditions may arise in that during the percussion operations with the mode with axial displacement or play, the lock ring is not locked, or when the axial displacement mode is not used, during normal drilling, the control ring is blocked, i.e. it can then not be used for clamping or tightening a drill.

OBJECTS OF THE INVENTION

It is the principal object of my invention to provide a percussion drill apparatus in which the chuck can carry out a considerable axial displacement movement without drawbacks of earlier systems.

It is also an object of the invention to provide a percussion drill apparatus in which the chuck is of relatively limited overall length, i.e. is relatively compact.

It is further an object of the invention to provide a percussion drill apparatus in which according to the position of the respective control ring, the clamping ring can freely rotate when axial displacement is precluded, and the clamping ring is held so as not to rotate when the axial displacement mode is selected for the operation.

Still another object of my invention is to improve upon the hammer drill systems of my earlier applications as identified above.

SUMMARY OF THE INVENTION

These and other objects of the invention are attained with a locking mechanism which includes a fixed lock element which is axially fixed or secured at least with respect to the drill spindle. This lock element can be actuated by the coupling ring which can be axially shifted but which can be secured so that it can not rotate. The lock element, furthermore, can be moved in the chuck jaw in radial direction into respective recesses which are circumferentially arranged at the chuck body, for precluding axial displacement of the chuck body.

At its rim which is directed towards the control ring, the coupling ring has a plurality of teeth which can engage and cooperate with matching teeth in the control ring when the coupling ring is axially displaced in the direction towards the drill.

When the coupling ring is in the position which allows the axial play mode, the lock element is disengaged from the recess in the chuck body. The coupling formations, when considered in axial direction, have a slightly greater length than the coupling element, therefore they allow the axial displacement of the chuck at the drill spindle and serve, in general, for the rotational security or integrity of the connection between the drill chuck and the drill spindle.

However, when the coupling ring is brought into its position which precludes the axial displacement, the locking element enters radially into the respective recess in the chuck body, whereupon the axial displacement mode can not be used.

Thus the magnitude of the axial displacement does not affect the overall length of the drill chuck.

Furthermore, the construction and the operation of the chuck are significantly simplified because only one coupling ring is used. This can be selectively used to select or preclude the axial play mode, and the coupling ring can be used at the same time for the locking of the control ring when employing the axial displacement mode.

In accordance with one embodiment, the coupling ring is formed at its inner surface with an inclined camming surface which extends annularly with respect to the chuck axis. The inclined surface provides a conical surface at which the lock element can contact. It is also preferred that the clear inner cross-sectional dimension of the coupling ring increases in the direction to its rim which is directed towards the drill spindle.

Advantageously the mentioned recess in the chuck body is an annular groove.

In yet another embodiment, the lock element is arranged in a recess or opening which extends radially in a sleeve which, in turn, is secured at the drill spindle. The one end of this sleeve is supported at an annular shoulder of the drill spindle, while its second supported end is supported by means of an interior annular shoulder formed at its inner circumferential surface at a radially outwardly directed annular collar of the chuck body.

The lock element is in any event in the region of the mentioned recess surrounded by the coupling ring.

The sleeve can be secured in customary manner at an externally threaded end of the drill spindle, and it can be secured by a corresponding lock element against loosening. A spring or snap ring can be arranged at the inner circumference of the sleeve, and this ring can radially project into the annular groove which forms the mentioned recess. Accordingly, this ring forms an abutment for limiting the axial displacement by being selectively contacted by one of two recess flanks of the annular groove which is adapted in its width to the axial displacement.

In the nonplay operational mode it can also be advantageous to arrange the spring ring so that it contacts the recess flank closest to the drill, and the lock element is contacting the recess flank closest to the drill spindle, at least in the region of its radial outer rim. Accordingly, the annular groove also cooperates in invoking or precluding axial displacement.

In a particularly simple embodiment, the lock element is formed as a spherical element, e.g. a steel ball. The recess can be a cylindrical bore which extends substantially in radial direction.

In the embodiments of the invention described, cessation of the axial displacement presupposes that the apparatus which provides motive power to the spindle is controlled in such a way that the spindle does not transmit percussion efforts. When such control or the respective switching operation are forgotten, this could lead to the situation in which the full percussion effect or impact will be transmitted to the chuck, which due to the locked situation with respect to the axial displacement could not yield. As a result, such an error would lead to the danger of the chuck being damaged.

In order to positively prevent such damage, in accordance with the invention the retainer which holds the lock element at the coupling ring is provided by a thrust-type abutment. This abutment is arranged, so as to be movable between a point near that side of the respective inclined surface which is directed away from the drill spindle, in the wall of the coupling ring, and it can be radially moved to such an extent that exit of the lock element from its recess can occur. The abutment is subjected to the force of a spring which forces the thrust-type abutment radially inwardly.

In accordance with a preferred embodiment, the thrust-type abutment is a snap or spring ring which can elastically yield in radial direction. This spring ring extends along the circumference of the coupling ring, and it is inserted into an annular groove in the inner surface of the coupling ring which has a depth sufficiently deep to permit the radially directed and elastic adjustment of the spring ring.

It is also preferred that the coupling ring at the drill spindle side be provided with a chuck sleeve which terminates at the annular groove and which forms one lateral wall thereof, as well as the respective inclined surface. This sleeve, in comparison with the coupling ring, is of a harder and more wear-resistant material.

As a result, the lock element can project into the recess when percussive strokes are carried out by the drill spindle and can retract against the force of a spring from the recess so that the axial displacement of the drill chuck at the drill spindle is automatically invoked.

According to another feature of the invention, the coupling ring is subjected to the force of a spring acting in the direction of its motion, and this spring is supported at the chuck body.

Yet another feature of my invention resides in the provision of at least one contact head in the chuck body. A recess is shaped in the wall of the coupling ring for this contact head, which recess is formed by two axial grooves which extend alongside one another and each having a specific length. These grooves are open on the side towards the entry of the contact head wherefor the coupling ring can be rotated on the chuck body in such manner that either one or the other of the two grooves are axially aligned with the contact head.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
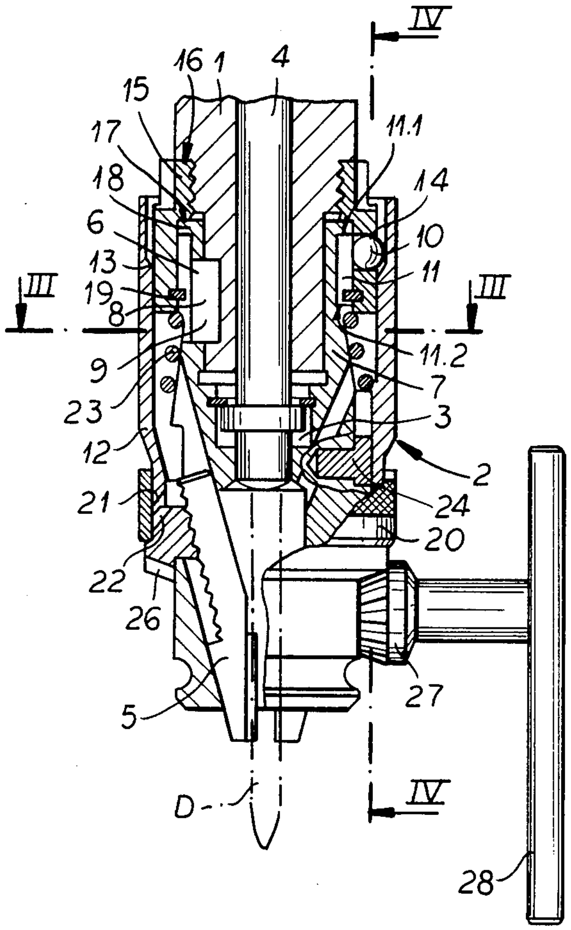
FIG. 1 shows a percussion drill apparatus according to the invention in longitudinal axial cross section and in part in side elevation.
Figure 2:
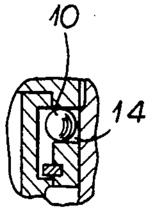
FIG. 2 is a detail particularly showing the lock element of the embodiment of FIG. 1, but in the mode barring axial play of the drill chuck at the drill spindle.

The two embodiments of a percussion or hammer drill shown in the drawing each comprise a motor-driven drill-spindle 1 of which only the lower portion is shown in the drawing.

A drill chuck generally identified by the reference numeral 2, is secured to the drill spindle 1 so as to be rotated thereby and/or to carry out the limited axial displacement relative thereto. The chuck 2 has a central axial passage 3 through which the percussion or impact action or stroke of a central shaft, ram or rod 4 is transferred or imparted to the end of the respective drill D which can be secured in the jaws 5 which, in turn, can be centrically adjusted by way of the control ring 20. The anvil shaft or central shaft 4 is axially guided in the hollow drill spindle 1, and it is also only shown in part in FIGS. 1 and 5.

The drill chuck 2 rotates with the drill spindle 1 because of coupling elements 6 which, when considered in the direction of rotation, engage positively into coupling retainers 8 and 9 which are respectively shaped in the drill spindle 1 and in the drill chuck 2. The coupling elements 6 allow the axial play of the chuck 2 at the drill spindle 1. Such play can be selectively locked out by a locking mechanism using a coupling ring 12.

The chuck body 7 has circumferentially disposed recesses 11 into which, with reference to the drill spindle 1, a lock element 10 can project. The lock element 10 is a ball which is axially fixed, but which can be displaced in radial direction with reference to the chuck axis. The lock element 10 can be actuated by the coupling ring 12 which, in turn, can be axially shifted but which can also be fixed so as not to rotate.

The coupling ring 12, furthermore, is equipped at its inner surface with an inclined camming surface 13 which extends annularly with respect to the chuck axis and which forms a conical surface which can be contacted by the lock element 10. The inclined surface 13 extends in such a way that the clear inner cross-sectional dimension of the coupling ring 12 increases in the direction to its rim which is directed towards the drill spindle 1.

Accordingly, when the coupling ring 12 is displaced in the direction towards the drill (downwardly) the axial play mode is selected. Conversely, the axial play mode is locked out when the coupling ring 12 is moved in the opposite direction. The lock element 10 is then moved, by way of the inclined surface 13, into the recess 11 at the chuck body 7 to lock it and so as to prevent its axial movements.

The recess 11 in the chuck body 7 has the configuration of an annular groove.

The lock element 10 is arranged in a recess 14 which extends radially in a sleeve 15 which is secured at the drill spindle 1. The sleeve 15, on the one hand, is supported at the forward end face of an annular shoulder 16 of the drill spindle 1 and, on the other hand, it is supported by way of an annular shoulder 17 provided at its circumferential surface, particularly at a radially outwardly directed annular collar 18 of the chuck body 7. The sleeve 15, in any event, is surrounded in the region of the recess 14 by the coupling ring 12.

A snap ring or similarly elastic spring ring 19 is arranged at the inner circumferential surface of the sleeve 15, and the spring ring 19 can project radially into the annular groove which forms the recess 11. Accordingly, this spring ring 19 provides an abutment for limiting the axial displacement for the two recess flanks 11.1 and 11.2 of the annular groove which has its width dimensioned to suit the axial displacement.

In the axial-play lockout mode, the spring ring 19 rests, as is indicated in FIG. 1, at the drill-side recess flank 11.2 of the annular groove, and the lock element 10 is in contacting relationship at the drill-spindle side with the recess flank 11.1, at least in the region of its radial outer rim.

The lock element 10 can, as noted, be a spherical element, e.g. a steel ball, and the recess or opening 14 which retains the lock element 10 in the sleeve 15 is formed by a cylindrical bore which extends in substantially radial direction.

Figure 5:
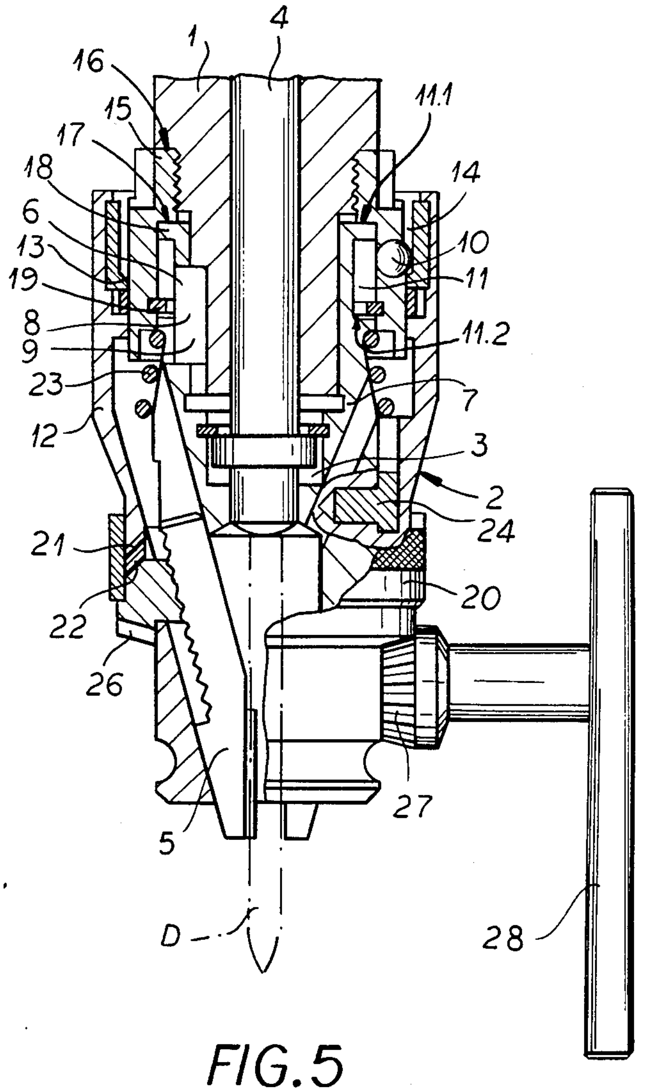
FIG. 5 is a view similar to that of FIG. 1 of a further embodiment of the invention.
Figure 6:
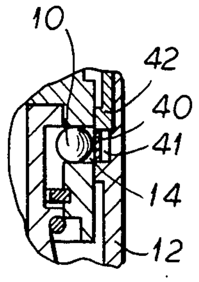
FIG. 6 is a detail particularly showing the lock element of the embodiment of FIG. 5, but in the mode without axial displacement of the drill chuck at the drill spindle.

In the embodiment of FIGS. 5 and 6, the contact element which holds the lock element 10 in the recess 11 at the coupling ring 12 includes a thrust-type abutment 40 which is movable, on the side facing away from the drill spindle 1 of the inclined surface 13, in the wall of the coupling ring 12, so as to be radially shiftable, for egress of the lock element 10 from the recess 11. The thrust-type abutment 40 can be a spring ring which inherently provides the force of a spring to force the abutment 40 radially inwardly.

The thrust-type abutment 40 is provided by an elastically yielding spring ring, yielding radially, and which extends along the circumference of the coupling ring 12. The spring ring can be inserted into an annular groove 41 having a depth which is of sufficient magnitude in consideration of the radial elastic adjustment of the spring ring. This annular groove 41 is arranged in the inner surface of the coupling ring 12.

The coupling ring 12 has an interior chuck sleeve 42 made of steel at the drill spindle side, which forms the lateral wall of the annular groove 41 and it has formed therein the conically inclined surface 13.

In order to prevent the drill chuck 2 from becoming loose and affecting the percussion operation in the percussion drill mode, i.e. when the axial play is present, or from becoming so tight that axial play of the drill tool is lost, the coupling ring 12 at its rim which is directed towards the control ring 20 has teeth 21. These teeth 21 can engage, when the coupling ring 12 is axially positioned closer to the drill, in mating teeth 22 of the control ring 20.

For this, the coupling ring 12 when considered in its direction of displacement, is subjected to the force of a spring 23 which in the embodiment shown in FIGS. 1 to 4 is supported at the chuck body 7 by a respective collar or shoulder. In the embodiment shown in FIGS. 5 and 6 the spring is also supported at the control sleeve 15, with the coupling ring 12 being pressed into its position which precludes the movement of the control ring 20, i.e. the coupling ring 12 is moved in the axial direction towards the drill (down).

Figure 4:
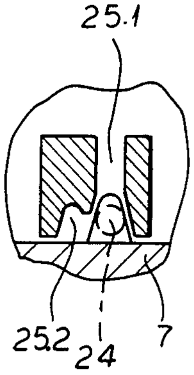
FIG. 4 is a cross-sectional view through the drill in the direction of line IV—IV in FIG. 1, but in the mode in which axial displacement of the drill chuck at the drill spindle exists.
Figure 3:
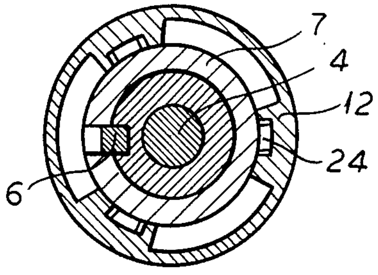
FIG. 3 is a cross-sectional view through the drill in the direction of line III—III in FIG. 1.

The chuck body 7 has at least one contact head 24 and a recess is provided in the wall of the coupling ring 12 to receive this head. This recess is formed by two axial grooves 25.1 and 25.2 which extend alongside one another and which are of different lengths (FIG.4). These two grooves 25.1 and 25.2 are open on the side towards the control ring 20 for the entry of the contact head 24. Accordingly, the coupling ring 12 can be rotated on the chuck body 7 in such a way that either one or the other of the two grooves 25.1 and 25.2 is axially aligned with the contact head 24.

When considered in the longitudinal direction of the grooves 25.1 and 25.2, the contact head 24 is extended by a transverse member and the lateral flanks of this extension provide contact surfaces for the flanks of the grooves. The contact head 24 can be the terminus of a pin which can be introduced in radial direction into a bore in the chuck body 7 and which anchors the contact head 24 at the chuck body 7.

When the lock element 10 is moved to be positioned in the recess 11, the axial displacement of the drill chuck 2 on the drill spindle is precluded, however, when the anvil shaft 4—in the event of error of the drive apparatus—is carrying out further percussion motions, the lock element 10 will be forced from the recess 11, due to the strains exerted on the chuck body 7. The spring ring which performs the functions of the thrust-type abutment 40 resiliently yields, so that the chuck body 7 can axially adapt to the stresses or strains.

The chuck 2 is otherwise of conventional construction. Thus, the chuck body 7 guides the chuck jaws 5. Adjustment of the jaws 5 is by way of a rotary but axially fixed control ring 20 which engages with interior screw threads in corresponding formations of the jaws 5. The control ring 20, in turn, has a gear wheel formation 26, the teeth of which engage in teeth of a conical gear 27 of a tightening key 28 which can be introduced for tightening or loosening at the chuck 2 (see the aforementioned applications and the references cited therein).

I claim:

1. A percussion drill comprising:
   - a rotatable percussion drill spindle;
   - a drive rod axially guided in said spindle for imparting percussion action to a drill bit;
   - a drill chuck adapted to receive said bit and mounted on said spindle for rotation therewith, said chuck having a body with an axially directed passage traversed by said rod for transferring the action of said drive rod to the bit, said chuck body being formed with circumferentially disposed recesses, and jaws on said body for holding said bit;
   - at least one coupling element for rotationally connecting said drill chuck to said drill spindle and enabling axial play of said chuck on said spindle;
   - a control ring for actuating said jaws, said control ring having teeth formed in one face thereof; and
   - a locking mechanism including a coupling ring and at least one lock element fixed with respect to said drill spindle, but being actuatable by said coupling ring, and being adapted to be moved into a respective one of said circumferential recesses of said chuck body for precluding axial displacement of said chuck body on said spindle, said coupling ring being mounted for displacement in axial direction, but securable against rotation, said coupling ring, at its rim which is directed towards said control ring, having a plurality of teeth which on axially positioning of the coupling ring towards the drill end of the chuck can operatively engage in the teeth of said control ring.

2. The percussion drill defined in claim 1 wherein said coupling ring is formed at an inner surface with a generally conical inclined camming surface which extends annularly with respect to the chuck axis and at which said at least one lock element is adapted to engage, with the clear inner cross-sectional dimension of the coupling ring at the inclined surface increasing in the direction towards the drill spindle end.

3. The percussion drill defined in claim 1 wherein at least one recess in said chuck body receiving said lock element is an annular groove.

4. The percussion drill defined in claim 1 wherein said coupling ring positively surrounds said lock element in the region of the respective recess.

5. The percussion drill defined in claim 1, further comprising a sleeve on said drill spindle and being supported at said chuck body, and said sleeve including the recess for said lock element.

6. The percussion drill defined in claim 5 wherein said drill spindle includes an annular shoulder for supporting said sleeve, and wherein said chuck body includes a radially outwardly directed annular collar for supporting said sleeve.

7. The percussion drill defined in claim 6 wherein said sleeve includes an annular shoulder provided at its inner circumferential surface for supporting said sleeve at said radially outwardly directed annular collar of said chuck body.

8. The percussion drill defined in claim 5, further comprising a spring ring at the inner circumferential wall of said sleeve and adapted to radially project into the respective annular groove, said spring ring providing an abutment for limiting the axial displacement by selectively contacting the recess flanks of the annular groove which in its width is adapted to the axial displacement.

9. The percussion drill defined in claim 8 wherein in an operating mode without axial play of said chuck, said spring ring is in operative contact with the recess flank which is closest to the respective drill, and said lock element is in contact with the recess flank which is closest to said drill spindle, at least in the region of its radial outer rim.

10. The percussion drill defined in claim 1 wherein said lock element is a spherical element, and the respective recess is a radially extending cylindrical bore.

11. The percussion drill defined in claim 1, further comprising a thrust-type abutment which is arranged to be movable such that in response to its movements said at least one lock element can enter into and egress from the respective recess.

12. The percussion drill defined in claim 11 wherein said thrust-type abutment is resiliently biased radially inwardly.

13. The percussion drill defined in claim 11 wherein said thrust-type abutment is an elastically yielding spring ring extending along the circumference of said coupling ring, said spring ring being inserted into a respective annular groove which is of sufficient depth in consideration of the radial elastic adjustment of the spring ring and which is arranged in the inner surface of said coupling ring.

14. The percussion drill defined in claim 2, further comprising a chuck sleeve at said coupling ring at the drill spindle side thereof, said chuck sleeve terminating at the respective annular groove, said chuck sleeve providing the respective lateral wall of the respective annular groove, and said chuck sleeve having formed therein said inclined surface.

15. The percussion drill defined in claim 1, further comprising a spring for exerting pressure upon said coupling ring in its direction of shifting, said spring being supported at said chuck body.

16. The percussion drill defined in claim 1, further comprising at least one contact head at said chuck body, said at least one contact head being adapted to engage in a respective recess of said coupling ring.

17. The percussion drill defined in claim 16 wherein the recess of said coupling ring is formed by two axial grooves which extend alongside one another and which are of different lengths, whereby said grooves on the side towards the entry of the contact head are open, and in consideration of which said coupling ring on said chuck body can be rotated in such a way that either one or the other of said two grooves is axially aligned with said at least one contact head.

18. A percussion drill comprising:

a rotatable drill spindle formed with an axial bore;

a chuck mounted on said spindle with axial play and formed with a bore aligned with said bore of said spindle, said chuck having a chuck body provided with jaws for receiving a drill bit and a control ring for displacing said jaws toward and away from said bit, said control ring having teeth;

an impact rod extending through said bores for engaging said bit; and means coupling said body with said spindle and including a radially displaceable element permitting said axial play in one radial position and locking out said axial play in another radial position, and a coupling ring surrounding said body for camming said element from one of said positions into the other of said positions and formed with teeth engageable with the teeth of said control ring.

* * * * *